Sept. 30, 1969   W. ANDERS ET AL   3,469,302

METHOD OF WELDING BARS OF COPPER AND COPPER ALLOYS

Filed Oct. 24, 1966

Walter Anders
Hans Strakosch
Horst Porth
Hartmut Bethge
INVENTORS.

BY Karl G. Ross
Attorney

3,469,302
**METHOD OF WELDING BARS OF COPPER
AND COPPER ALLOYS**
Walter Anders, Halle (Saale), Hans Strakosch, Hettstedt, Molmeck, Horst Porth, Vatterode, and Hartmut Bethge, Hettstedt, Germany, assignors to VEB Vereinigte NE-Metall-Halbzeugwerke Hettstedt, Hettstedt, Sudharz, Germany, a corporation of Germany
Filed Oct. 24, 1966, Ser. No. 588,889
Int. Cl. B23k 5/00; 31/02
U.S. Cl. 29—481    3 Claims

ABSTRACT OF THE DISCLOSURE

A method of welding copper or copper-alloy bars together wherein the bars are tapered at their joint and are butt welded under axial pressure in a gas flame so that, in spite of the tapering configuration, beads of metal are extruded outwardly and contain substantially all of the contaminants of the weld. The beads are confined between collars on the bars and are machined off in a subsequent operation.

---

Figure 1:
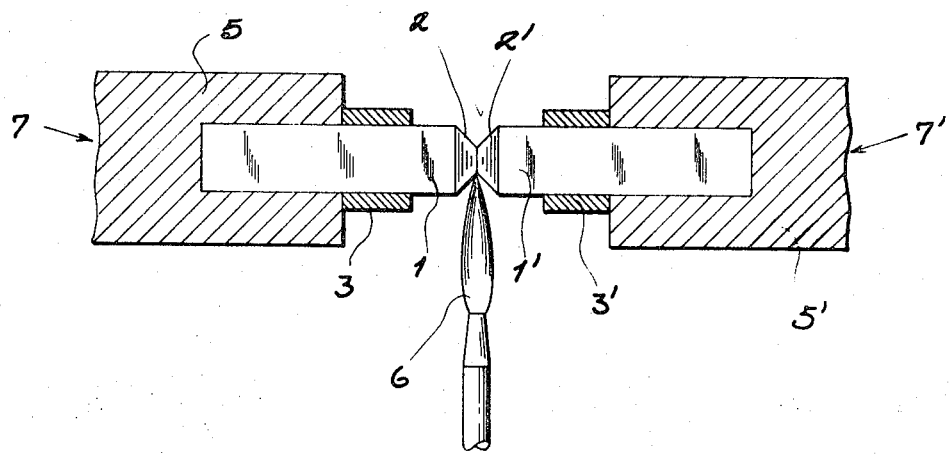

Our present invention relates to the welding of metal bars, particularly those consisting of copper and its alloys, under the heat of a gas flame and with application of axial pressure.

In the butt-welding of such bars, difficulties are frequently encountered by reason of the fact that the material, on being heated to the necessary welding temperature (usually above 500° C.), will not withstand a steady pressure of the magnitude required for the formation of a uniformly good weld. This difficulty is aggravated by the high thermal conductivity of copper and its alloys which dictates a very short exposure of the workpieces to intense heat. Moreover, copper is known to be weldable only in a deoxidized state and at high temperatures tends to absorb oxygen with formation of a copper/copper-oxide eutectic whose melting point is less than that of pure copper. The eutectic concentrates at the grain boundaries, thereby reducing the high-temperature strength of the joint.

Because of all these problems it has not been feasible heretofore to apply the technique of welding by a gas flame, as in torch welding, successfully to bars of copper or copper alloys with noncircular cross-sections and/or cross-sections exceeding approximately 30 mm.²

It is, therefore, the general object of our invention to provide an improved method of welding which is applicable to copper-containing metal bars of large and irregular cross-sections, particularly sections above 10 cm.², and which will result in uniform high-quality butt welds between such bars.

We have found, in accordance with our present invention, that the aforestated object can be realized if we taper the confronting ends of the bars to be joined to reduce the initial area of contact to a fraction of the cross-sectional area of the bars; upon the subsequent application of heat and axial pressure to the abutting ends, the frustocones or frustums thereof are deformed so that part of the material is extruded radially outwardly to form a peripheral bead around the joint. This bead, we have established, contains practically the entire copper/copper-oxide eutectic formed in the welding process so that the joint proper, exposed when the bead is machined off, is of uniform structure and virtually indistinguishable in its physical properties from any cross-section of either bar.

In order to prevent a spreading of the deformation of the bars beyond the immediate region of the butt joint, we prefer to clamp—spursuant to a further feature of our invention—each bar during welding in a heat-resistant collar fitting tightly around the bar at a location axially spaced from the tapered end thereof to an extent just sufficient to allow the formation of the aforedescribed peripheral bead by radial extrusion of the material between the two collars. Advantageously, each bar may be firmly gripped in a chuck immediately behind its collar, the chuck helping maintain the original shape of the bar beyond the weld.

Figure 2:
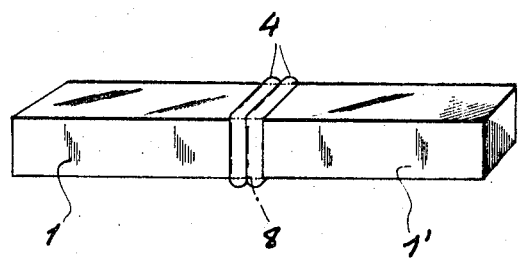

The invention will be described in greater detail with reference to the accompanying drawing in which:

FIG. 1 is a somewhat diagrammatic view of an assembly for the butt-welding of two bars in accordance wtih our invention; and FIG. 2 is a perspective side view of the welded bars upon their removal from the assembly of FIG. 1.

In FIG. 1 we have shown a pair of copper bars 1, 1' with confronting ends 2, 2' of tapered configuration defining frustocones with an apex angle here shown to equal approximately 60°. Each of the bars 1, 1' is encompassed, at a location slightly spaced from its tapered end 2 or 2', by a tightly fitted ring 3 or 3' of heat-resistant material. The remainder of the bar is mounted in a respective chuck 5, 5' through which axial pressure is applied to the contacting ends 2, 2' of the aligned bars, as indicated by arrows 7 and 7', concurrently with the application of intense heat from a gas flame 6. It will be understood that several such gas flames may be directed simultaneously against the joint 2, 2' from different direaction and/or that the chucks 5, 5' with the bars 1, 1' may be rotated about their axis during the welding step.

As a result of the operation just described, the bars 1, 1' upon their removal from chucks 5, 5' are surrounded by a peripheral bead 4 at the joint formed between their welded ends. This has been illustrated in FIG. 2 which shows the bars after the removal of clamping rings 3, 3'; as indicated in dot-dash lines at 8 in FIG. 2, the bead 4 may be removed by machining to expose a continuous member of constant cross-section corresponding to that of the original bars.

As best seen in FIG. 2, the bars 1, 1' may be of non-circular (here square) profile; in a specific instance, these bars had a height and width of 10 cm. and were welded at a temperature above 500° C. under an axial pressure of 120 tons which is somewhat greater than the theoretical minimum pressure calculated at 80 tons. Metallurgical tests of an etched cut through the weld showed no additional oxygen absorption in the welding zone and indicated a homogeneous structure free from faults and harmful occlusions.

We claim:

1. A method of welding two bars of copper or copper alloy, comprising the steps of tapering confronting ends of both said bars to frustum configuration, butt-welding said ends in the heat of a gas flame, applying sufficient axial pressure to said bars during the butt-welding step to extrude heated metal radially outwardly at the weld joint and form impurity-containing beads around the butt-welded joints beyond the original cross-section outlines of the bars, and machining off the extruded metal after cooling.

2. A method as defined in claim 1 wherein a heat-resistant collar is tightly fitted around each bar in the vicinity of its tapered end prior to butt-welding to define the boundary of said beads.

3. A method as defined in claim 2 wherein each bar is gripped in a chuck immediately behind said collar during butt-welding.

(References on following page)

References Cited

UNITED STATES PATENTS 3,259,969  7/1966  Tessmann _____ 29—498 X

FOREIGN PATENTS 476,733  9/1951  Canada.

JOHN F. CAMPBELL, Primary Examiner
RICHARD B. LAZARUS, Assistant Examiner

U.S. Cl. X.R.

29—482, 498